United States Patent
Kimishima

(10) Patent No.: US 9,110,150 B2
(45) Date of Patent: Aug. 18, 2015

(54) POSITIONING DEVICE, POSITIONING METHOD, PROGRAM, AND RECORDING MEDIUM

(75) Inventor: Masato Kimishima, Tokyo (JP)

(73) Assignee: Sony Corporation, Tokyo (JP)

( * ) Notice: Subject to any disclaimer, the term of this patent is extended or adjusted under 35 U.S.C. 154(b) by 768 days.

(21) Appl. No.: 13/396,944

(22) Filed: Feb. 15, 2012

(65) Prior Publication Data

US 2012/0245885 A1  Sep. 27, 2012

(30) Foreign Application Priority Data

Mar. 25, 2011 (JP) ................ 2011-067002

(51) Int. Cl.
  *G01L 1/12*  (2006.01)
  *G01S 5/02*  (2010.01)
(52) U.S. Cl.
  CPC ................ *G01S 5/0263* (2013.01)
(58) Field of Classification Search
  CPC ................ G01V 1/008; G01V 3/081
  USPC ........................................ 702/138
  See application file for complete search history.

(56) References Cited

U.S. PATENT DOCUMENTS

| 6,446,001 B1 * | 9/2002 | Sakai et al. ............... 701/439 |
| 2006/0274146 A1 * | 12/2006 | Ohashi et al. ............ 348/113 |
| 2011/0065460 A1 | 3/2011 | Kimishima |
| 2011/0066363 A1 | 3/2011 | Kimishima |

FOREIGN PATENT DOCUMENTS

| JP | 6-23865 | 2/1994 |
| JP | 6-323865 | 11/1994 |
| JP | 2008-215924 | 9/2008 |

* cited by examiner

*Primary Examiner* — Elias Desta
(74) *Attorney, Agent, or Firm* — Sony Corporation

(57) ABSTRACT

There is provided a positioning device including a geomagnetism detection section which detects geomagnetism, an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position, and an identification section which identifies a current location based on the area acquired by the acquisition section.

9 Claims, 18 Drawing Sheets

CONTOUR MAP OF MAGNETIC DIP

CONTOUR MAP OF TOTAL MAGNETIC INTENSITY

MAGNETIC MAP (MAGNETIC DIP)

MAGNETIC MAP (TOTAL MAGNETIC INTENSITY)

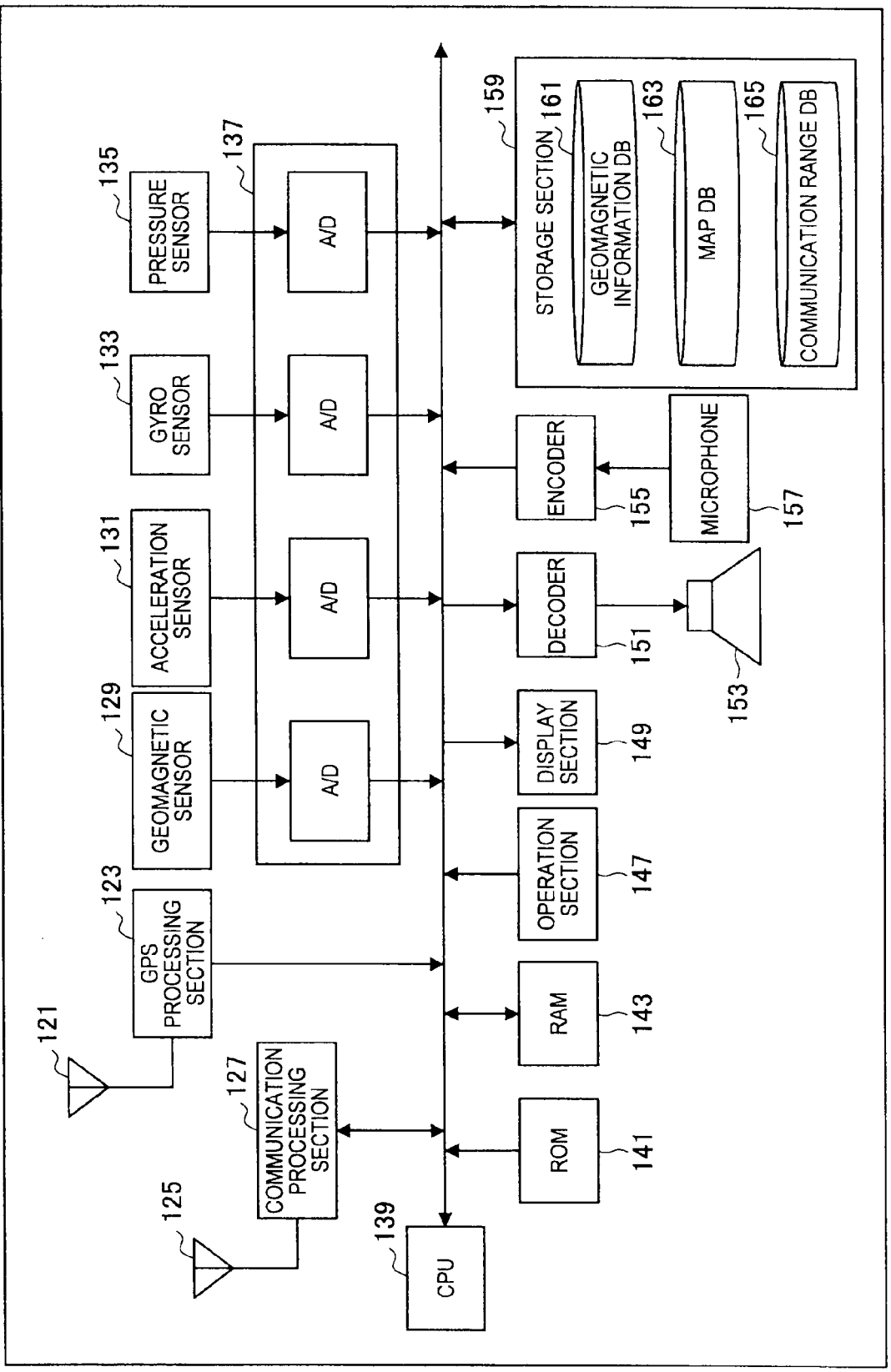

POSITIONING DEVICE, POSITIONING METHOD, PROGRAM, AND RECORDING MEDIUM

BACKGROUND

The present disclosure relates to a positioning device, a positioning method, a program, and a recording medium.

Services based on position information have been in widespread use, particularly car navigation systems using positioning information obtained by a GPS (Global Positioning System). In particular, a portable navigation device has been arrived on the market recently, and a smartphone having various types of positioning functions has been in widespread use. Accordingly, the position information will be used in wider fields.

For the measurement of position information, absolute positioning and relative positioning are used. The absolute positioning measures a uniquely determined position (absolute position). Further, the relative positioning measures a relative position with respect to a specific position. Examples of the absolute positioning include GPS measurement, Wi-Fi positioning, and measurement of positions using position information of a base station. For example, JP 2008-215924A discloses a positioning device which measures a current location using information of latitude determined from the magnetic dip in addition to the GPS measurement.

SUMMARY

However, there are some positions of places where it is still difficult to be measured by either of the methods. In light of the foregoing, it has been potentially desired to provide a new positioning technique capable of acquiring an absolute position.

According to an embodiment of the present disclosure, there is provided a positioning device which includes a geomagnetism detection section which detects geomagnetism, an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position, and an identification section which identifies a current location based on the area acquired by the acquisition section.

According to another embodiment of the present disclosure, there is provided a positioning method which includes detecting geomagnetism, acquiring a matching area by checking detected values of a total magnetic intensity and a magnetic dip of the detected geomagnetism against geomagnetic information including values of a total magnetic intensity and a magnetic dip which are associated with an absolute position, and identifies a current location based on the acquired area.

According to another embodiment of the present disclosure, there is provided a program for causing a computer to function as a positioning device including a geomagnetism detection section which detects geomagnetism, an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position, and an identification section which identifies a current location based on the area acquired by the acquisition section.

According to another embodiment of the present disclosure, there is provided a computer-readable recording medium which records therein a program for causing a computer to function as a positioning device including a geomagnetism detection section which detects geomagnetism, an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position, and an identification section which identifies a current location based on the area acquired by the acquisition section.

According to the embodiments of the present disclosure described above, there can be provided the positioning device, the positioning method, the program, and the recording medium, which are capable of acquiring an absolute position using a new positioning technique.

BRIEF DESCRIPTION OF THE DRAWINGS

FIG. 18 is a block diagram showing an example of a hardware configuration of the positioning device according to the first to third embodiments of the present disclosure.

DETAILED DESCRIPTION OF THE EMBODIMENT(S)

Figure 1:
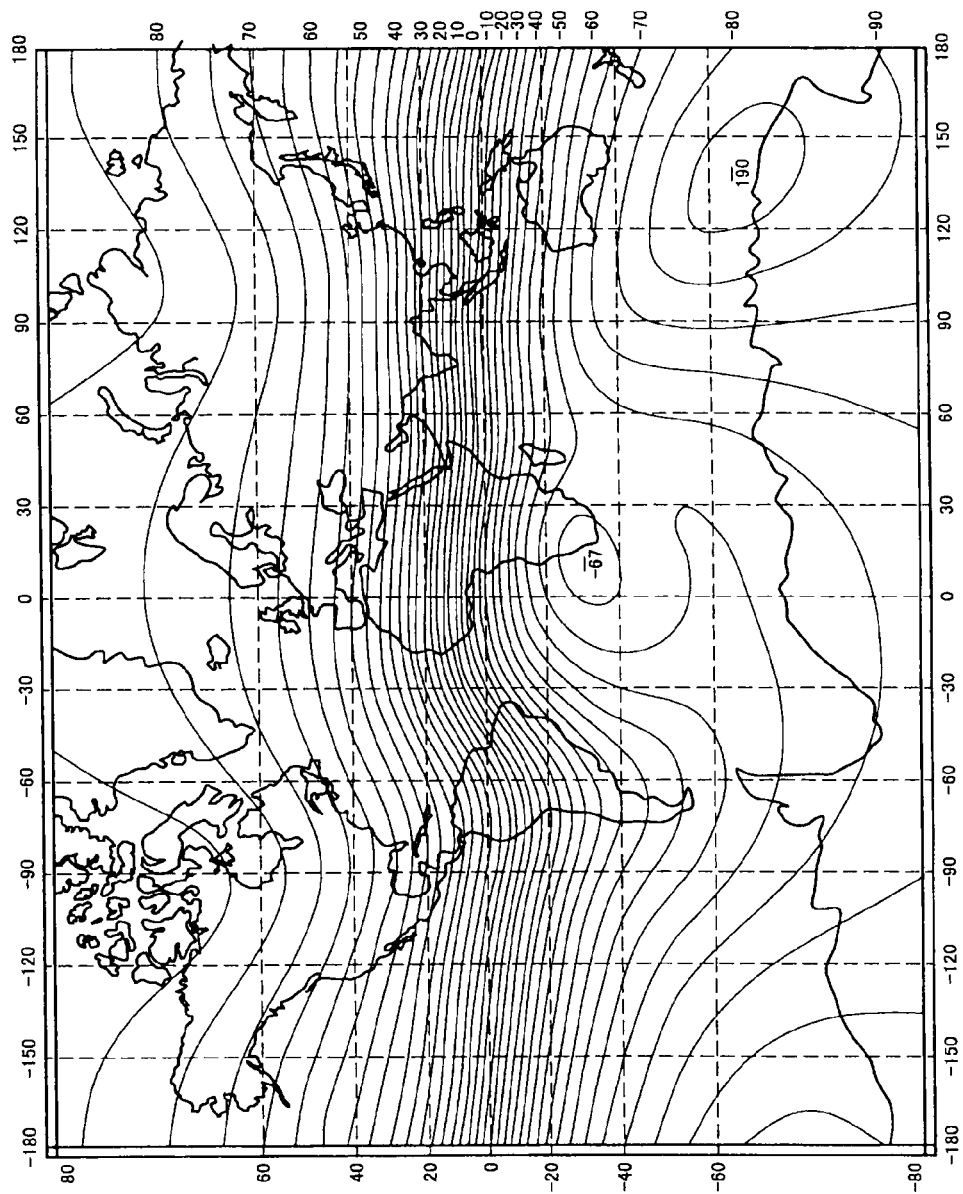
FIG. 1 is an explanatory diagram showing a world contour map of magnetic dip.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Outline
2. First embodiment
2-1. Functional configuration
2-2. Operation
3. Second embodiment (example having positioning function different from geomagnetic positioning)
3-1. Functional configuration
3-2. Operation
4. Third embodiment (example having altitude calculation function)
4-1. Functional configuration
4-2. Operation
5. Hardware configuration
6. Examples of effects

1. Outline

Figure 2:
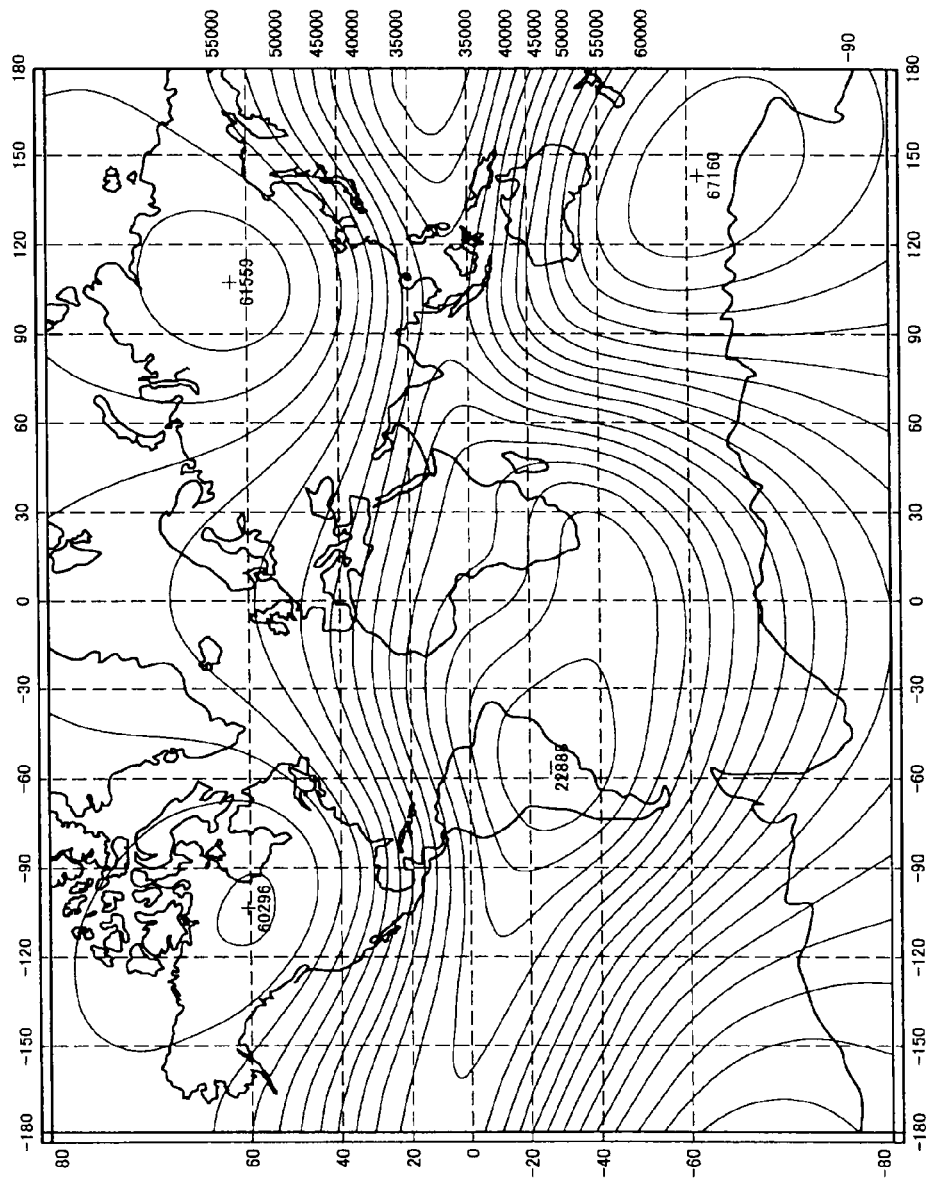
FIG. 2 is an explanatory diagram showing a world contour map of total magnetic intensity.

First, with reference to FIG. 1 and FIG. 2, an outline of absolute positioning according to the first to third embodiments of the present disclosure will be described. FIG. 1 is an explanatory diagram showing a world contour map of magnetic dip. FIG. 2 is an explanatory diagram showing a world contour map of total magnetic intensity.

As a method of performing absolute positioning of nowadays, there are typically exemplified measurement of positions using a GPS and a Wi-Fi access point, measurement of positions using a mobile base station, and measurement of positions using an IMES (Indoor Messaging System), which is also called an indoor GPS, and a marker such as an RF tag.

However, in order to use those types of absolute positioning, it was necessary that infrastructures for each type of positioning be set in the surroundings. For example, in order to measure a position using the GPS, a GPS signal is received by communicating with a GPS satellite. Further, in order to use the Wi-Fi positioning, position information of a Wi-Fi access point is acquired by communicating with the access point. Further, in order to use the measurement of positions using the mobile base station, position information of the mobile base station is acquired by communicating with the base station. In order to use the measurement of positions using the IMES, position information is received from an IMES transmission device. In order to use the measurement of positions using a marker such as an RF tag, it was necessary to read the marker.

Accordingly, in the present situation, a positioning method involving acquiring an absolute position is not available in the places where the infrastructures for measuring a position are not set. For example, in the places with few infrastructures such as mountains, valleys, and forests, it is difficult to use the Wi-Fi positioning, the measurement of positions using a mobile base station, and the measurement of positions using an IMES and a marker such as an RF tag. Further, since the GPS radio waves greatly attenuate in passing through water, the GPS reception sensitivity remarkably deteriorates in a place with the sky blocked with trees and rock walls. In the places with poor infrastructures, such as mountains, valleys, and forests, it is highly probable that an action involving a risk is being carried out, such as mountain-climbing. Therefore, in such places, it is considered that the demand for acquiring a current location is particularly high. Further, Japan has a small land area and has high infrastructure density. In foreign countries each having a larger land area and lower infrastructure density than in Japan, the demand is particularly high since the region corresponding to the conditions mentioned above is larger than in Japan.

Accordingly, the absolute positioning method according to the first to third embodiments of the present disclosure identifies a current location using the magnetic size and the magnetic dip. Geomagnetism is a general term that refers to the magnetism of the earth and the magnetic field on the earth caused by the magnetism, and is represented by a vector quantity having a size and a direction. The size of the geomagnetic vector is referred to as total magnetic intensity. Further, the angle between a geomagnetic vector and a horizontal plane is referred to as magnetic dip. The total magnetic intensity and the magnetic dip each have a value specific to a position.

For example, FIG. 1 shows a world contour map of magnetic dip. As described above, the magnetic dip represents an angle between a geomagnetic vector and a horizontal plane, and a downward direction with respect to the horizontal plane represents a positive value. The values of magnetic dips vary largely in the south and north directions, the value becomes larger and a horizontal component used for azimuth calculation becomes smaller as getting closer to the poles. For example, the magnetic dip of Tokyo is about 50°, the magnetic dip of Finland is about 75°, the magnetic dip of Mexico is about 10°, and the magnetic dip of the South Pole is about −90°.

Further, FIG. 2 shows a world contour map of total magnetic intensity. As described above, the total magnetic intensity represents a size of a geomagnetic vector. For example, the total magnetic intensity of Tokyo is about 45 µT, the total magnetic intensity of Finland is about 60 µT, the total magnetic intensity of Mexico is about 25 µT, and the total magnetic intensity of the South Pole is about 65 µT.

The absolute positioning method according to each embodiment to be described below acquires current position information by using the total magnetic intensity and the magnetic dip, and extracting the region having the matching total magnetic intensity and magnetic dip. Further, the positioning accuracy may be further enhanced by combining another piece of information to the information of the geomagnetic information.

2. First Embodiment (2-1. Functional Configuration)

Figure 3:
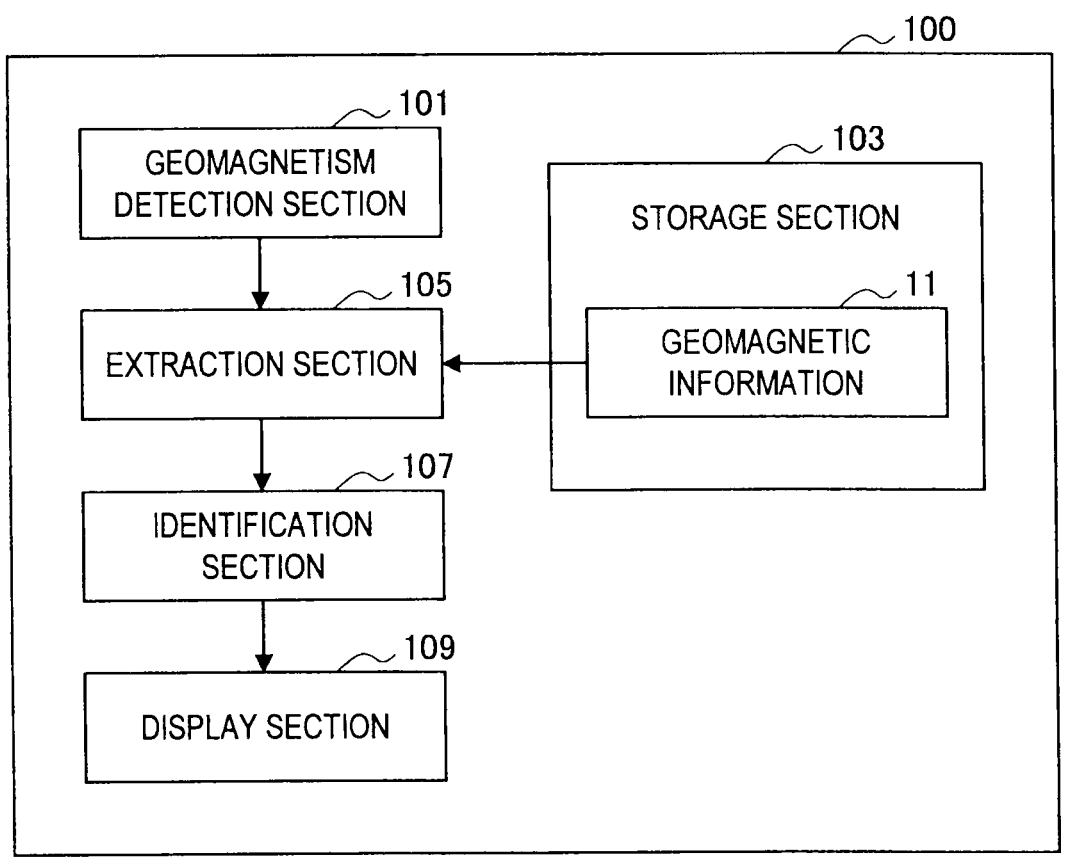
FIG. 3 is a functional block diagram of a positioning device according to a first embodiment of the present disclosure.

Here, with reference to FIG. 3, functional configuration of a positioning device 100 according to a first embodiment of the present disclosure will be described. The positioning device 100 is an example of an information processing apparatus having a positioning function of acquiring current position information based on the total magnetic intensity and the magnetic dip. The positioning device 100 may also be an information processing apparatus such as a mobile phone including a smartphone, a PND (Personal Navigation Device), a notebook PC (Personal Computer), a mobile music playback device, a mobile video processing device, and a mobile game console.

The positioning device 100 mainly includes a geomagnetism detection section 101, a storage section 103, an extraction section 105, an identification section 107, and a display section 109.

The geomagnetism detection section 101 has a function of detecting the total magnetic intensity and the magnetic dip. The geomagnetism detection section 101 has a geomagnetic sensor and an acceleration sensor, for example, and may calculate the magnetic dip by identifying an azimuth using gravitational acceleration detected by the acceleration sensor. The geomagnetism detection section 101 can supply the extraction section 105 with the information of detected geomagnetism.

The storage section 103 is an example of a device for storing data, which is included in the positioning device 100, and can include a storage medium, a recording device for recording data in the storage medium, a reading device for reading out the data from the storage medium, and a deletion device for deleting the data recorded in the storage medium. The storage section 103 can store geomagnetic information. The geomagnetic information includes information of the total magnetic intensity and the magnetic dip associated with an absolute position. Note that, although the geomagnetic information is stored in the storage section 103 which is included in the positioning device 100, the present technology is not limited to such an example. For example, the geomagnetic information may be stored in a removable storage medium that can be read by the positioning device 100. Further, the geomagnetic information may be acquired by the positioning device 100 from an external device via a communication section or a removable storage medium which is not shown, and may be stored in the storage section 103.

Figure 4:
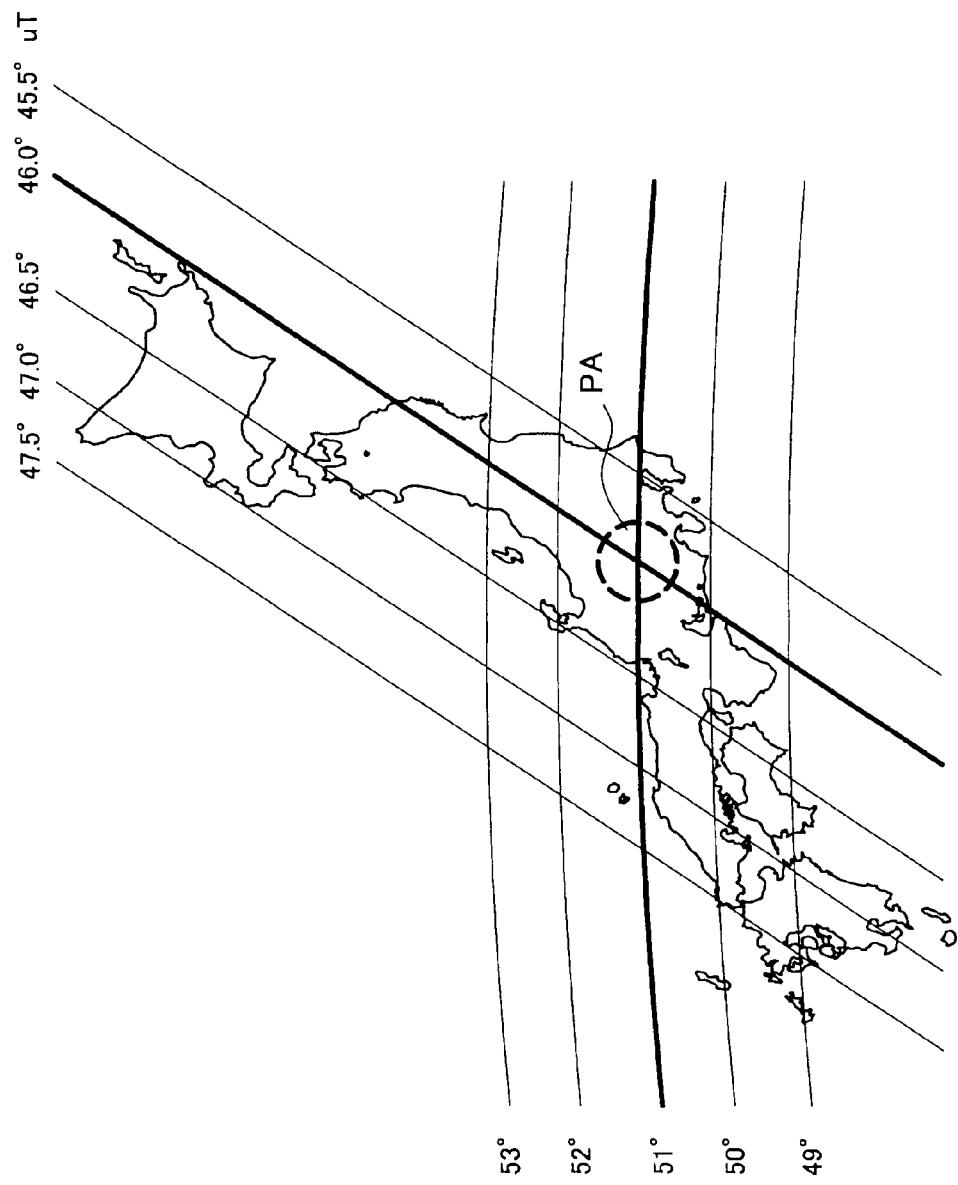
FIG. 4 is an explanatory diagram showing an outline of identifying a current location according to the embodiment.

The extraction section 105 has a function of checking the information of the total magnetic intensity and the magnetic dip detected by the geomagnetism detection section 101 against the information of the total magnetic intensity and the magnetic dip included in the geomagnetic information stored in the storage section 103, and extracting an area having the matching total magnetic intensity and magnetic dip. The extraction section 105 is an example of an acquisition section which acquires the matching area obtained by checking values of the total magnetic intensity and the magnetic dip against the geomagnetic information. For example, as shown in FIG. 4, an isoclinic line which connects points of equal magnetic dip and an isometric line of total magnetic intensity which connects points of equal total magnetic intensity are not parallel with each other and have an intersection point in many cases. The extraction section 105 extracts an area including the intersection point. FIG. 4 is an explanatory diagram showing an outline of identifying a current location according to the embodiment. For example, in the example shown in FIG. 4, in the case where the total magnetic intensity and the magnetic dip detected by the geomagnetism detection section 101 are 46.0 μT and 51°, respectively, the extraction section 105 may set an area PA as the extraction area. The extraction section 105 can supply the identification section 107 with information of the extracted area.

Note that a range of the area to be extracted by the extraction section 105 depends on resolution of a geomagnetic sensor. For example, magnetic accuracy demanded from the geomagnetic sensor and the geomagnetic information with respect to demanded positional accuracy is as shown in FIG. 1 below. Here, the geomagnetic variation for each 100 km is set to 500 nT. Further, the extraction section 105 may enhance the resolution by performing average processing using an average of detection values acquired from the geomagnetic sensor multiple times.

| Margin of positional error [km] | Demanded resolution [nT] |
| --- | --- |
| 20 | 100 |
| 10 | 50 |
| 1 | 5 |
| 0.1 | 0.5 |

The identification section 107 has a function of identifying a current location from the area extracted by the extraction section 105. In the present embodiment, the identification section 107 identifies the area extracted by the extraction section 105 as the current location.

The display section 109 can be realized by a display device and a display control section which generates a screen to be displayed on the display device and also controls the display on the screen. The display section 109 can generate a display screen for providing the user with the area identified by the identification section 107 as the current location.

Heretofore, an example of the functions of the positioning device 100 according to the present embodiment has been described. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the positioning device 100 according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

(2-2. Operation)

Figure 5:
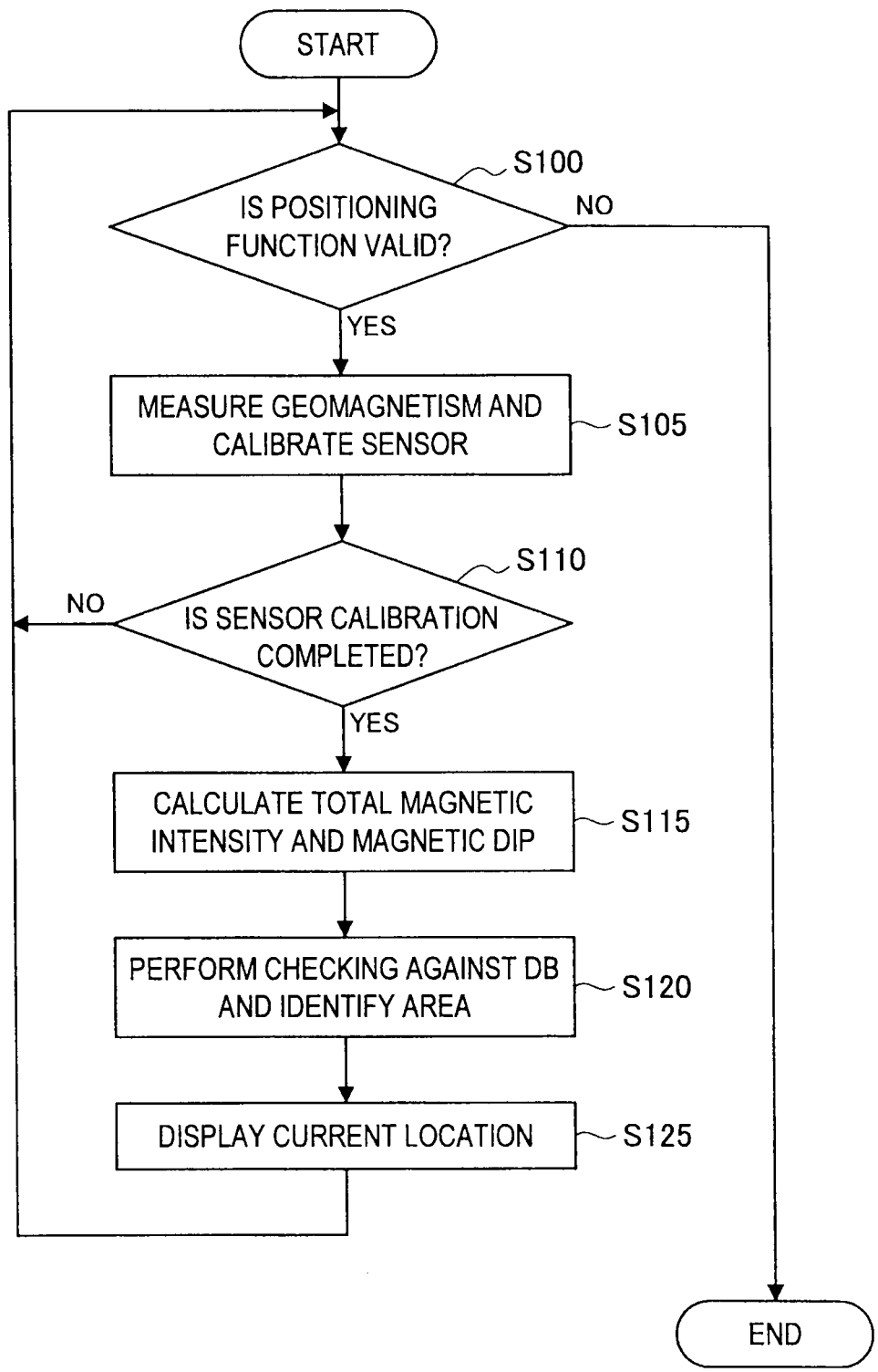
FIG. 5 is a flowchart showing an operation of the positioning device according to the embodiment.

Next, with reference to FIG. 5, an operation of the positioning device 100 according to the first embodiment will be described. FIG. 5 is a flowchart showing an operation of the positioning device according to the embodiment.

First, the positioning device 100 determines whether a positioning function is valid (S100). Here, in the case where the positioning function is invalid, the processing is terminated. On the other hand, in the case where it is determined that the positioning function is valid, the geomagnetism detection section 101 starts measuring geomagnetism and calibrating the sensor (S105). Then, the geomagnetism detection section 101 determines whether the calibration of the sensor is completed (S110). In the case where it is determined in Step S110 that the calibration of the sensor is not completed yet, the processing returns to Step S100. On the other hand, in the case where it is determined that the calibration of the sensor is completed, next, the geomagnetism detection section 101 calculates the total magnetic intensity and the magnetic dip based on at least the detection value obtained by the geomagnetic sensor (S115).

When the geomagnetism detection section 101 calculates the total magnetic intensity and the magnetic dip in the current location, the extraction section 105 checks the geomagnetic information in the database against the total magnetic intensity and the magnetic dip detected by the geomagnetism detection section 101, and thereby extracting the area having the matching total magnetic intensity and magnetic dip. Then, the identification section 107 identifies the area extracted by the extraction section 105 as an area of the current location (S120). The display section 109 displays the area identified by the identification section 107 as the current location (S125).

Figure 6:
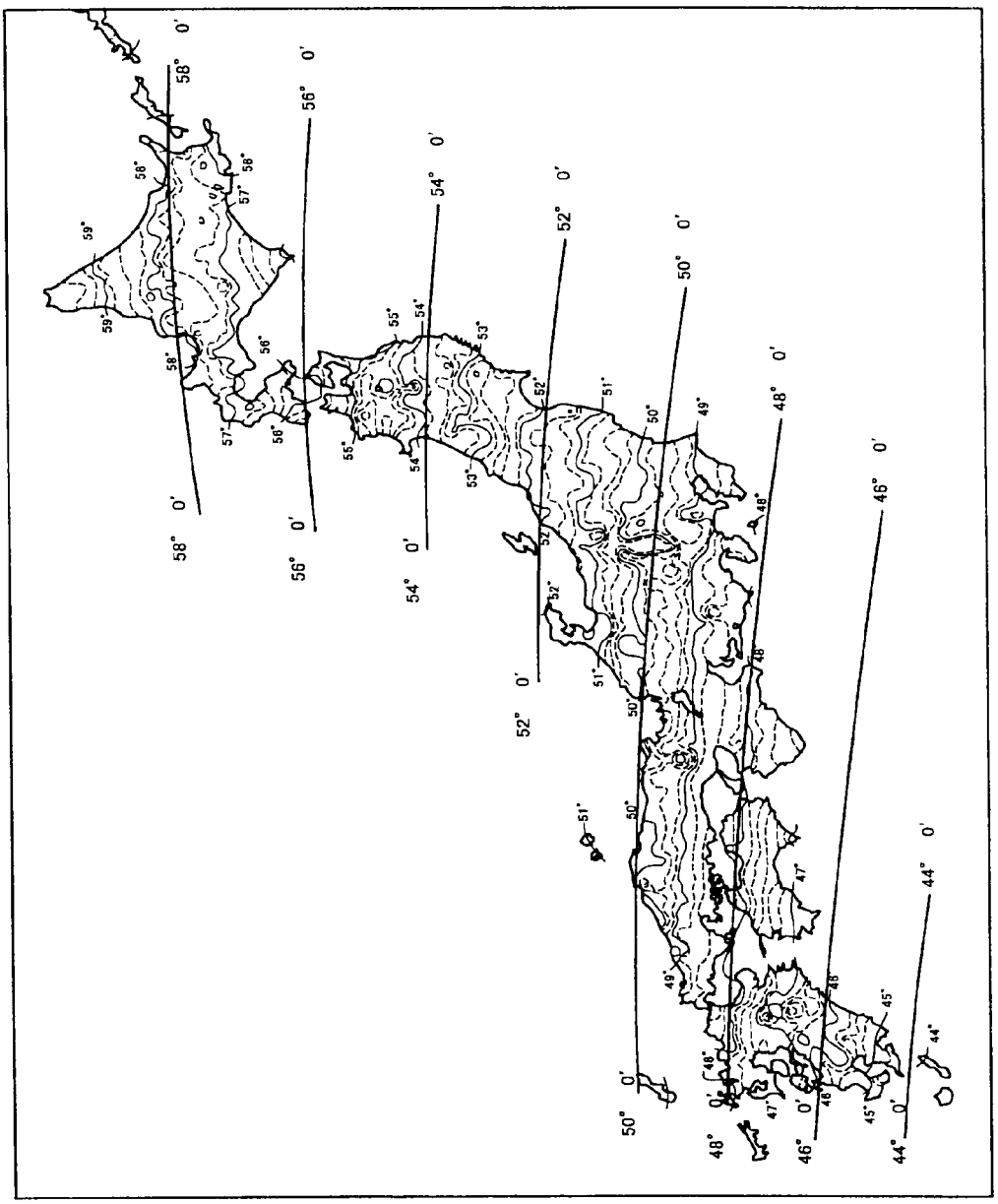
FIG. 6 is an explanatory diagram showing a magnetic dip contour map of Japan.
Figure 7:
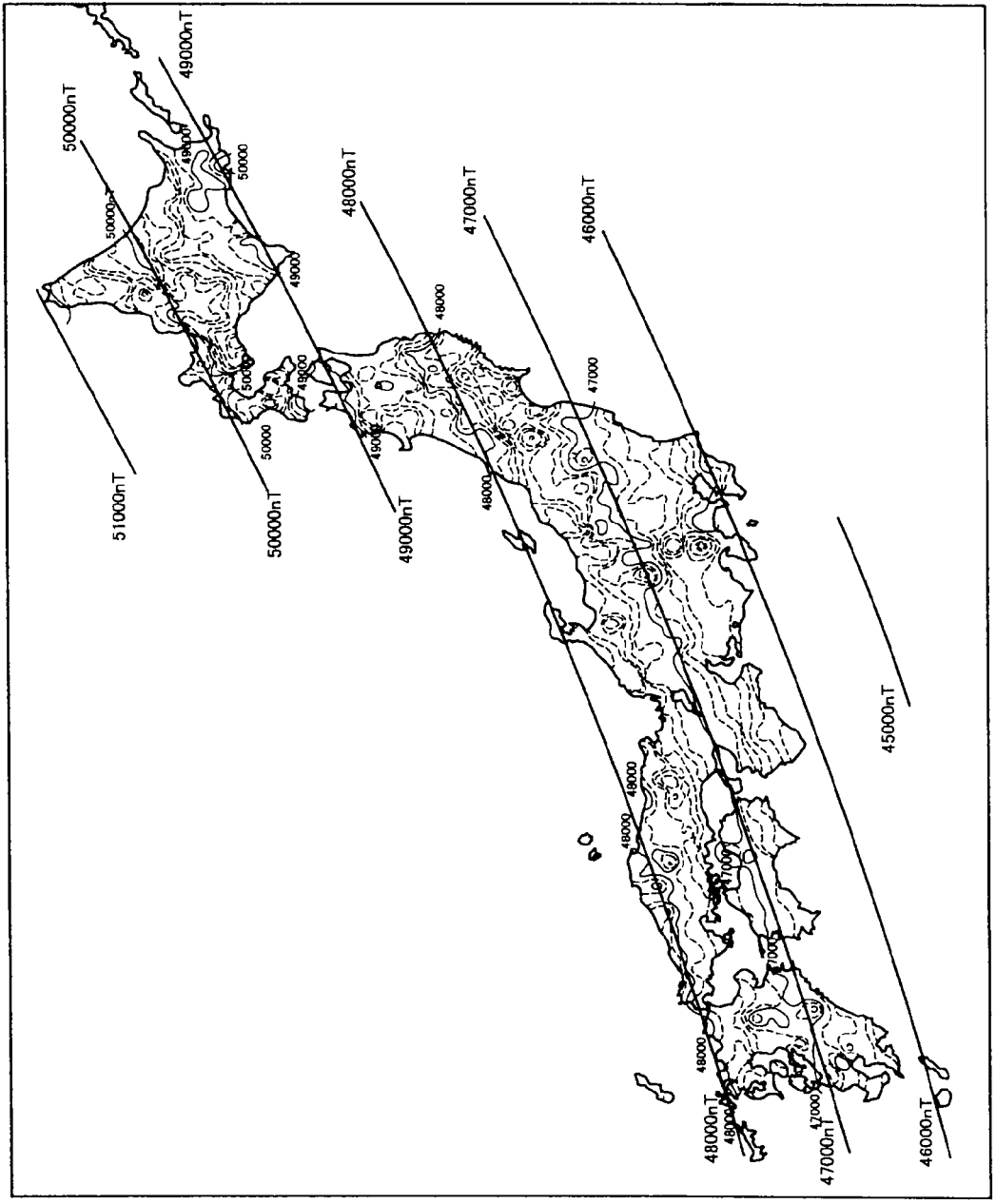
FIG. 7 is an explanatory diagram showing a total magnetic intensity contour map of Japan.

Note that the isoclinic line and the isometric line of total magnetic intensity shown in FIG. 4 are simplified for description, and in reality, the magnetic dip contour map and the total magnetic intensity contour map of Japan are as those shown in FIG. 6 and FIG. 7, respectively. FIG. 6 is an explanatory diagram showing a magnetic dip contour map of Japan. FIG. 7 is an explanatory diagram showing a total magnetic intensity contour map of Japan. Note that solid lines shown in FIG. 6 are each an isoclinic line approximated by a quadratic curve, and are each drawn for every 2°, from 44° to 58°. Further, the solid lines shown in FIG. 7 are each an isometric line of total magnetic intensity approximated by a quadratic curve, and are each drawn for every 1000 nT, from 45000 nT to 51000 nT.

3. Second Embodiment

Example Having Positioning Function Different from Geomagnetic Positioning (3-1. Functional Configuration)

Figure 8:
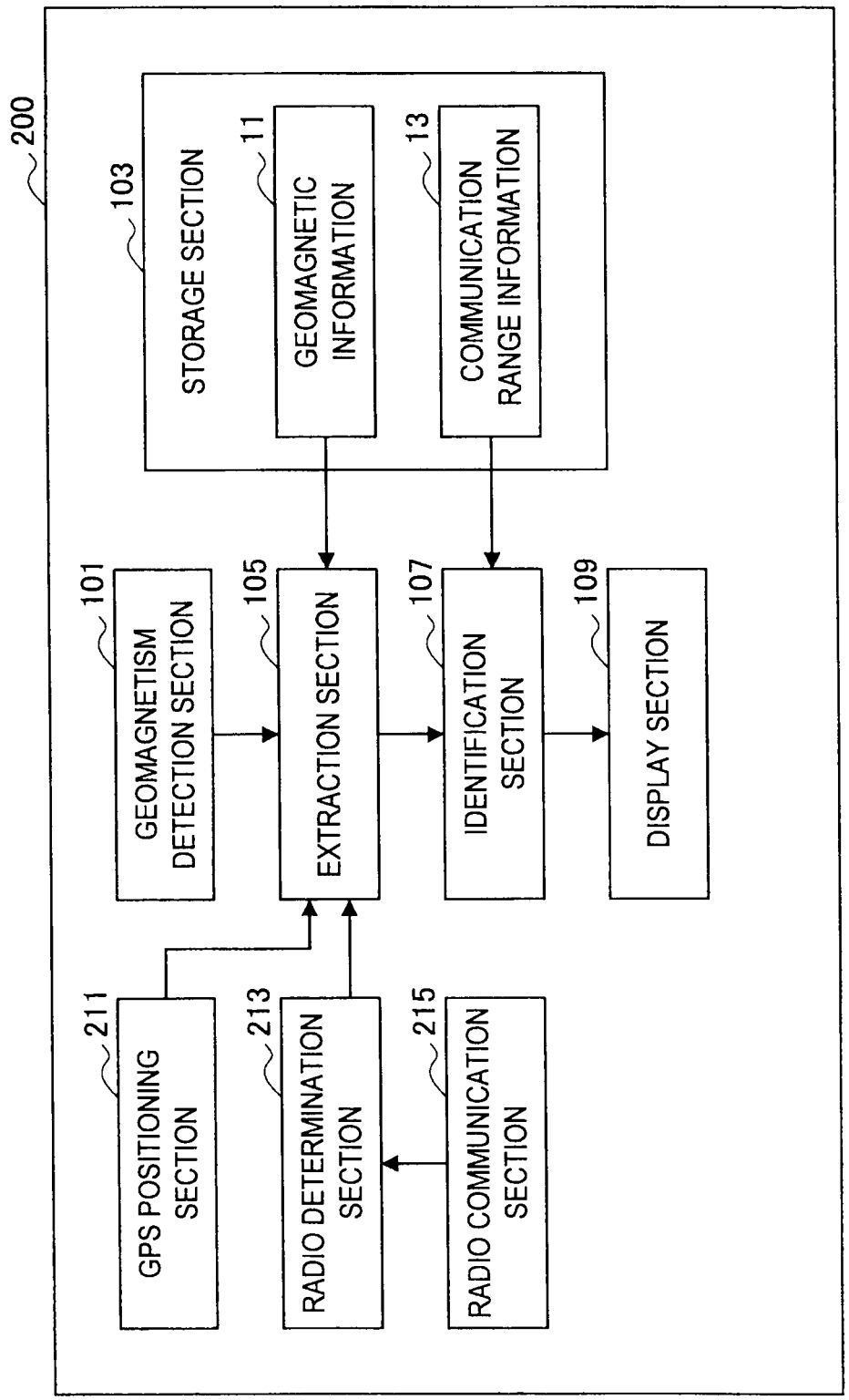
FIG. 8 is a functional block diagram of a positioning device according to a second embodiment of the present disclosure.

Next, with reference to FIG. 8, a functional configuration of a positioning device 200 according to a second embodiment of the present disclosure will be described. The positioning device 200 differs from the positioning device 100 according to the first embodiment in that the positioning device 200 has, in addition to the positioning function of acquiring the current position information based on the total magnetic intensity and the magnetic dip, another positioning section which measures a position based on different information than geomagnetism. The positioning device 200 having the other positioning section can select, in the case where multiple areas are extracted in the measurement of a position based on geomagnetism, any one of the areas based on the positioning results of the past obtained by the other positioning section.

The positioning device 200 mainly includes a geomagnetism detection section 101, a storage section 103, an extraction section 105, an identification section 107, a display section 109, a GPS positioning section 211, a radio determination section 213, and a radio communication section 215. Hereinafter, the structural elements that are different from those included in the positioning device 100 according to the first embodiment will be mainly described.

The GPS positioning section 211 is an example of a positioning section which measures a position based on different information than geomagnetism. The GPS positioning section 211 has a function of calculating a current location based on GPS signals received from GPS satellites. The GPS positioning section 211 may include, for example, a GPS antenna for receiving GPS signals and a GPS processing section for calculating the current location based on the received GPS signals.

The radio determination section 213 is another example of the positioning section which measures a position based on different information than geomagnetism. The radio determination section 213 has a function of measuring a position based on information of base stations obtained via the radio communication section 215. For example, the radio determination section 213 estimates distances from the respective base stations based on the reception strengths of the Wi-Fi radio waves received from the multiple base stations, and calculates a current location based on the triangulation principle using the distances from the respective base stations and the pieces of position information of the respective base stations.

The radio communication section 215 has a function of communicating with another device wirelessly via a base station. The radio communication section 215 is a communication interface which is configured from, for example, a communication device for establishing a connection with a network such as the Internet. The radio communication section 215 may include a communication antenna for transmitting/receiving a signal used for the communication, a processing circuit for performing various types of signal processing for the communication, and the like.

The extraction section 105 has a function of checking the information of the total magnetic intensity and the magnetic dip detected by the geomagnetism detection section 101 against the information of the total magnetic intensity and the magnetic dip included in the geomagnetic information stored in the storage section 103, and extracting an area having the matching total magnetic intensity and magnetic dip. The extraction section 105 is an example of an acquisition section which acquires the matching area obtained by checking values of the total magnetic intensity and the magnetic dip against the geomagnetic information. Note that the extraction section 105 confirms whether there is another positioning function available which is more accurate than the measurement of a position using the information of geomagnetism, and in the case where the other positioning function is available, the position information obtained by another positioning section can be used. For example, in the present embodiment, in the case where the measurement of a position using the GPS positioning section 211 is available, the extraction section 105 may acquire position information obtained by the GPS positioning section 211 and may supply the identification section 107 with the acquired position information. Alternatively, in the case where the measurement of a position using the radio determination section 213 is available, the extraction section 105 may acquire position information obtained by the radio determination section 213 and may supply the identification section 107 with the acquired position information.

Figure 9:
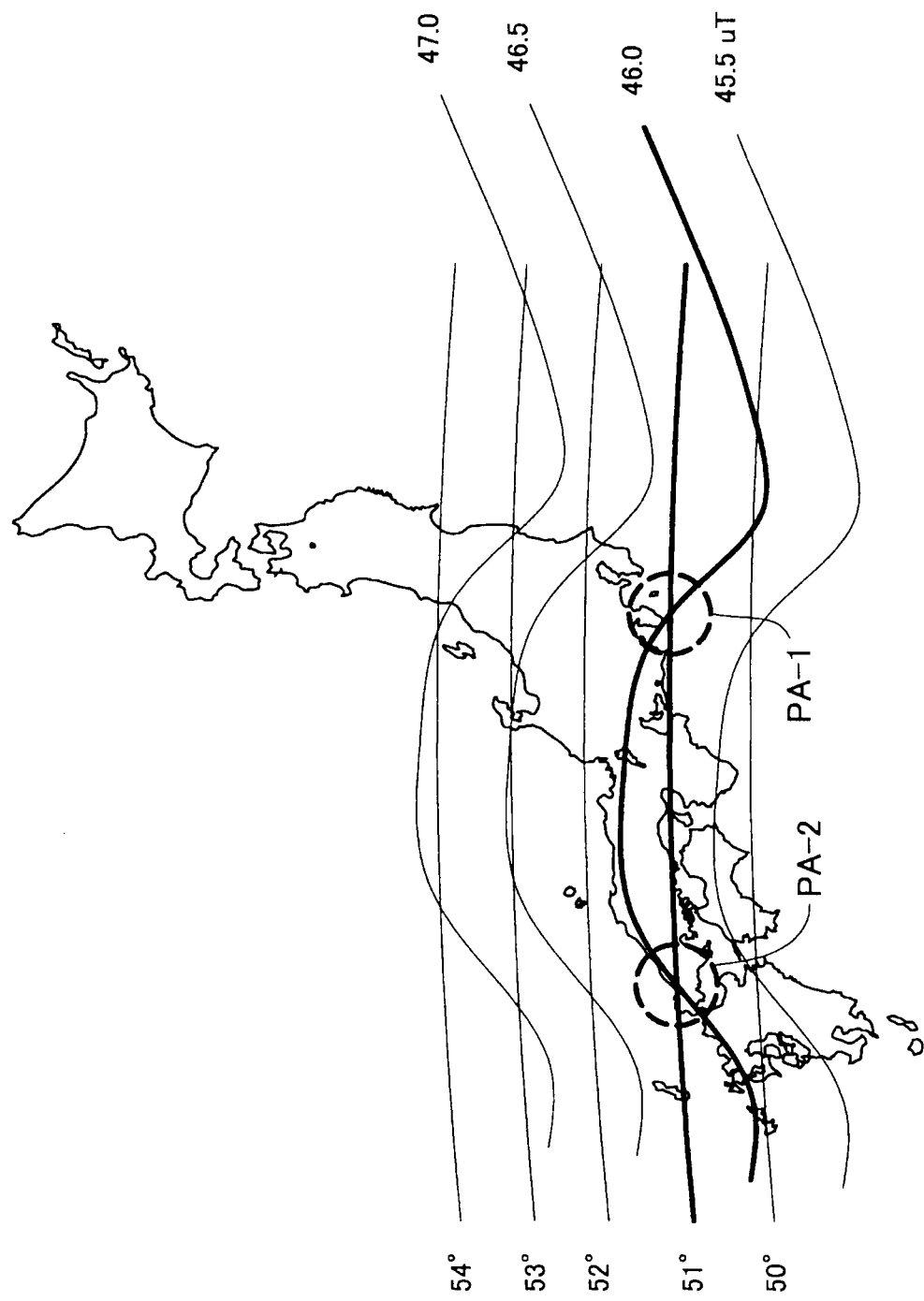
FIG. 9 is an explanatory diagram showing an outline of identifying a current location according to the embodiment.

Further, the identification section 107 has a function of identifying a current location from the area extracted by the extraction section 105. In the present embodiment, the identification section 107 can select, in the case where there are multiple areas extracted based on the information of the total magnetic intensity and the magnetic dip detected by the geomagnetism detection section 101, any one of the areas out of the extracted multiple areas as the current location, based on position information of the past obtained by another positioning section. For example, as shown in FIG. 9, in the case where an isoclinic line intersects an isometric line of total magnetic intensity at multiple points, the extraction section 105 extracts multiple areas. For example, in the example shown in FIG. 9, in the case where the total magnetic intensity and the magnetic dip detected by the geomagnetism detection section 101 are 46.0 µT and 51°, respectively, the extraction section 105 may set an area PA-1 and an area PA-2 as the extraction areas.

The identification section 107 can identify any one of the areas out of the extracted areas PA-1 and PA-2 as the current location. In this case, the identification section 107 may identify the current location based on the latest position information obtained by the other positioning section. The identification section 107 can set the area which is nearest to the latest position information obtained by the other positioning section as the current location, for example. Further, the identification section 107 may also identify the current location by estimating the distance moved from the latest position information, based on the latest position information obtained by the other positioning section, the time elapsed from the date/time at which the latest position information was acquired, movement history information, and the like.

Further, the identification section 107 has a function of further narrowing down the area of the current location. For example, the identification section 107 checks the extraction area PA against communication range information 13, and can thereby set a part outside the communication range within the extraction area as the current location. Here, in the present embodiment, since the measurement of a position using geomagnetism is executed only when it is difficult to perform the measurement of a position using the radio determination section 213, the identification section 107 can narrow down the region of the current location to the region outside the communication range.

Heretofore, an example of the functions of the positioning device 200 according to the present embodiment has been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the positioning device 200 according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

(3-2. Operation)

Figure 10:
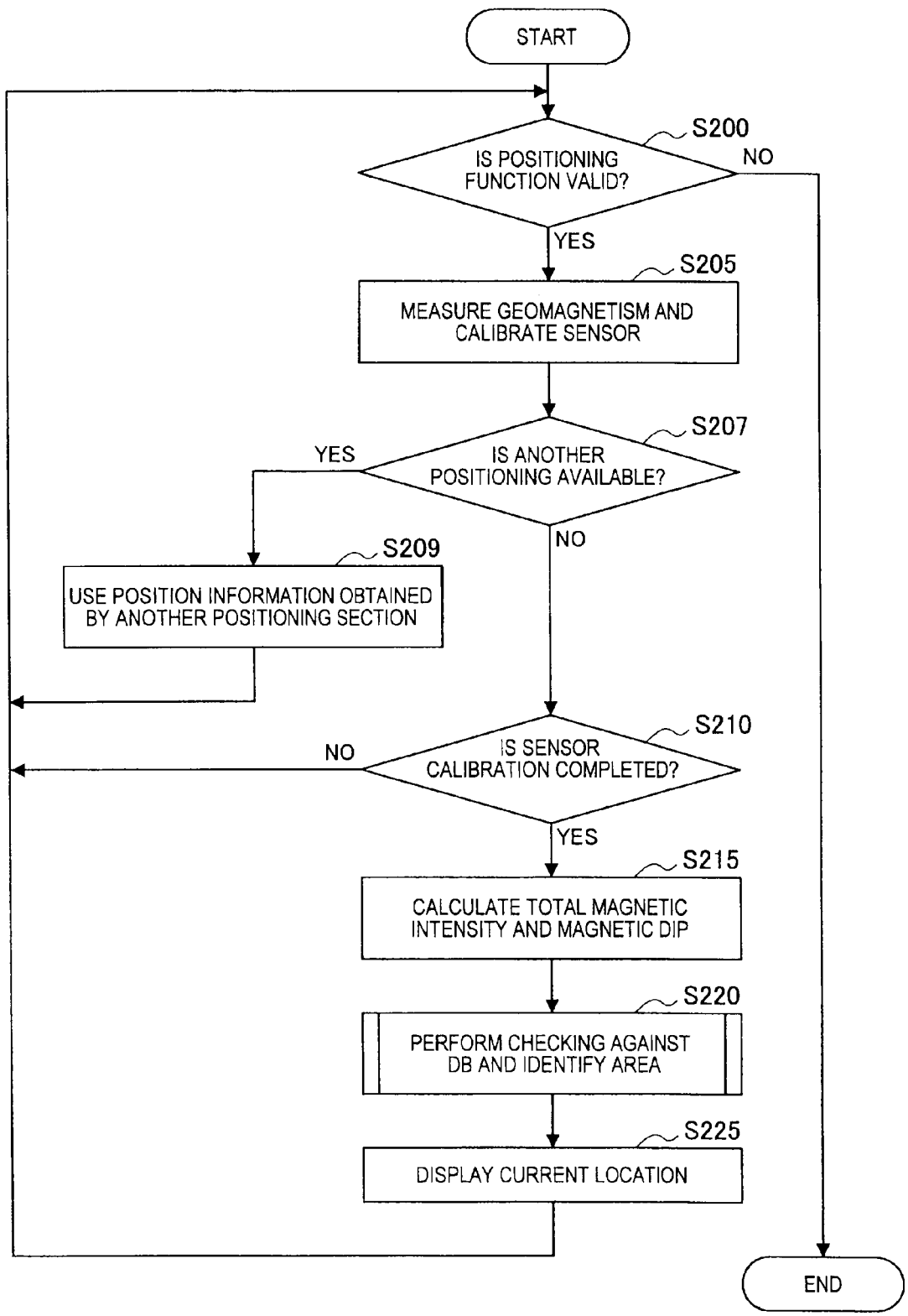
FIG. 10 is a flowchart showing an operation of the positioning device according to the embodiment.

Next, with reference to FIG. 10, an operation of the positioning device 200 according to the second embodiment will be described. FIG. 10 is a flowchart showing an operation of the positioning device according to the embodiment.

First, the positioning device 200 determines whether a positioning function is valid (S200). Here, in the case where the positioning function is invalid, the processing is terminated. On the other hand, in the case where it is determined that the positioning function is valid, the geomagnetism detection section 101 starts measuring geomagnetism and calibrating the sensor (S205). Then, the extraction section 105 determines whether measurement of a position using another positioning section is available (S207). In the present embodiment, since the positioning device 200 has positioning functions using the GPS positioning section 211 and the radio determination section 213 in addition to the measurement of a position using geomagnetism, it is determined whether those positioning functions are available. In the case where it is determined that another positioning function is available, the extraction section 105 uses the position information obtained by the other positioning section (S209). In this case, the extraction section 105 supplies the identification section 107 with the position information obtained by the other positioning section, and the identification section 107 identifies the supplied position information as the current location.

On the other hand, in the case where it is determined in Step S207 that another measurement of a position is not available, next, the geomagnetism detection section 101 determines whether the calibration of the sensor is completed (S210). In the case where it is determined in Step S210 that the calibration of the sensor is not completed yet, the processing returns to Step S200. On the other hand, in the case where it is determined that the calibration of the sensor is completed, next, the geomagnetism detection section 101 calculates the total magnetic intensity and the magnetic dip based on at least the detection value obtained by the geomagnetic sensor (S215).

When the geomagnetism detection section 101 calculates the total magnetic intensity and the magnetic dip in the current location, the extraction section 105 checks the geomagnetic information in the database against the total magnetic intensity and the magnetic dip detected by the geomagnetism detection section 101, and thereby extracting the area having the matching total magnetic intensity and magnetic dip. Then, identification section 107 identifies an area of the current location out of the area extracted by the extraction section 105 (S220). The display section 109 displays the area identified by the identification section 107 as the current location (S225).

Figure 11:
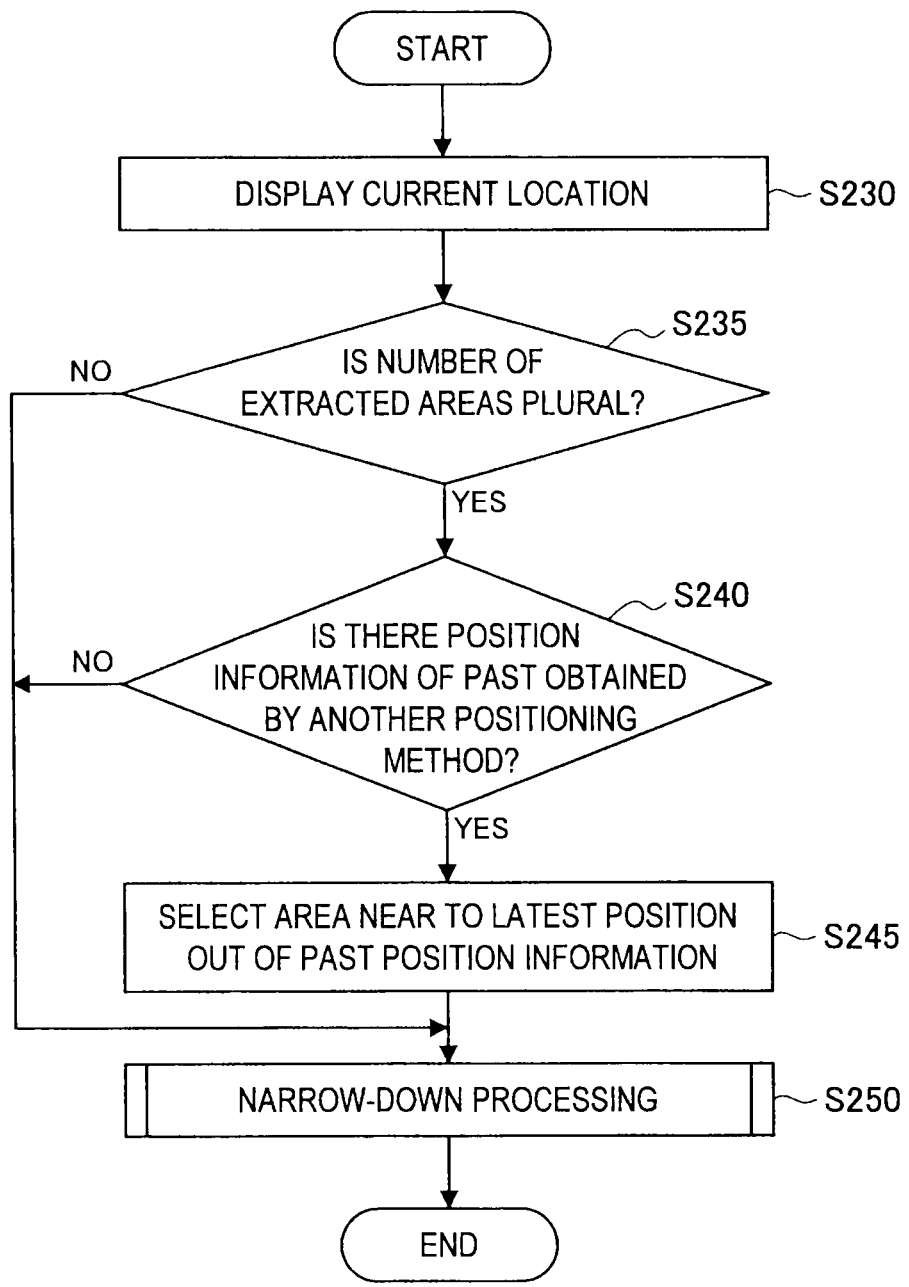
FIG. 11 is a flowchart showing area identification processing according to the embodiment.

Here, there is shown in FIG. 11 a detailed flow of DB matching check and area identification processing in Step S220. First, the extraction section 105 checks the geomagnetic information 11 in the database against the total magnetic intensity and the magnetic dip detected by the geomagnetism detection section 101, and thereby extracting, as an extraction area, the area having the matching total magnetic intensity and magnetic dip (S230). Then, the extraction section 105 supplies the identification section 107 with the extracted area. The identification section 107 determines whether the number of the supplied extraction areas is plural (S235). In the case where the number of the extraction areas is plural, the identification section 107 determines next whether position information of the past obtained by another positioning method is stored (S240).

Figure 12:
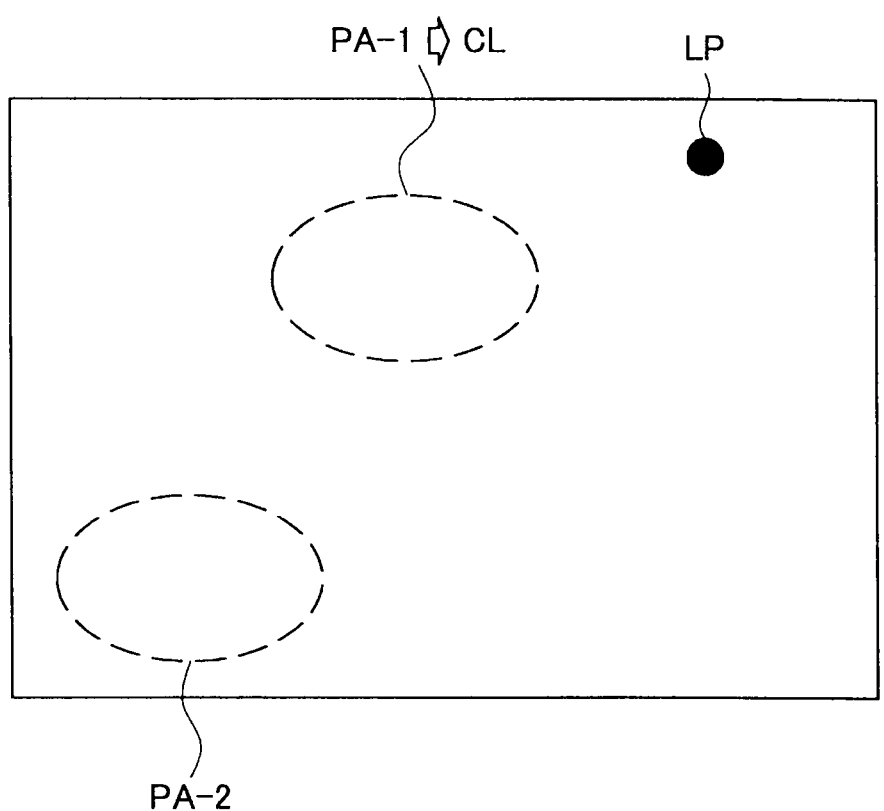
FIG. 12 is an explanatory diagram showing an outline of area identification according to the embodiment.

In the case where it is determined in Step S240 that there is the position information of the past obtained by another positioning method, the identification section 107 selects the area which is nearest to the latest position information acquired in the past out of the extraction areas (S245). For example, as shown in FIG. 12, let us assume the case where two areas, an extraction area PA-1 and an extraction area PA-2, are extracted. FIG. 12 is an explanatory diagram showing an outline of area identification according to the embodiment. Here, the identification section 107 compares the distance between latest position information LP out of the pieces of position information acquired by another positioning section and each extraction area PA. In this case, since the distance between the extraction area PA-1 and the latest position information LP is shorter than the distance between the extraction area PA-2 and the latest position information LP, the identification section 107 can set the extraction area PA-1 as a current location CL. Note that, in the case where it is determined in Step S235 that the number of extraction areas is one, the processing of Step S240 and the processing of Step S245 are omitted. In addition, the identification section 107 performs narrow-down processing of the area indicating the current location (S250).

Figure 13:
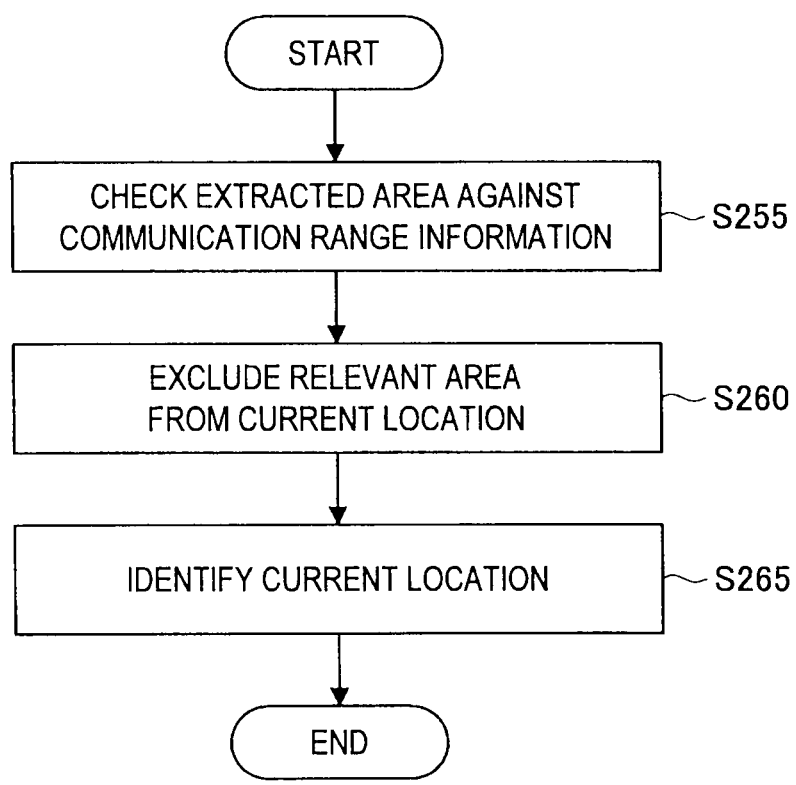
FIG. 13 is a flowchart showing current location narrow-down processing according to the embodiment.
Figure 14:
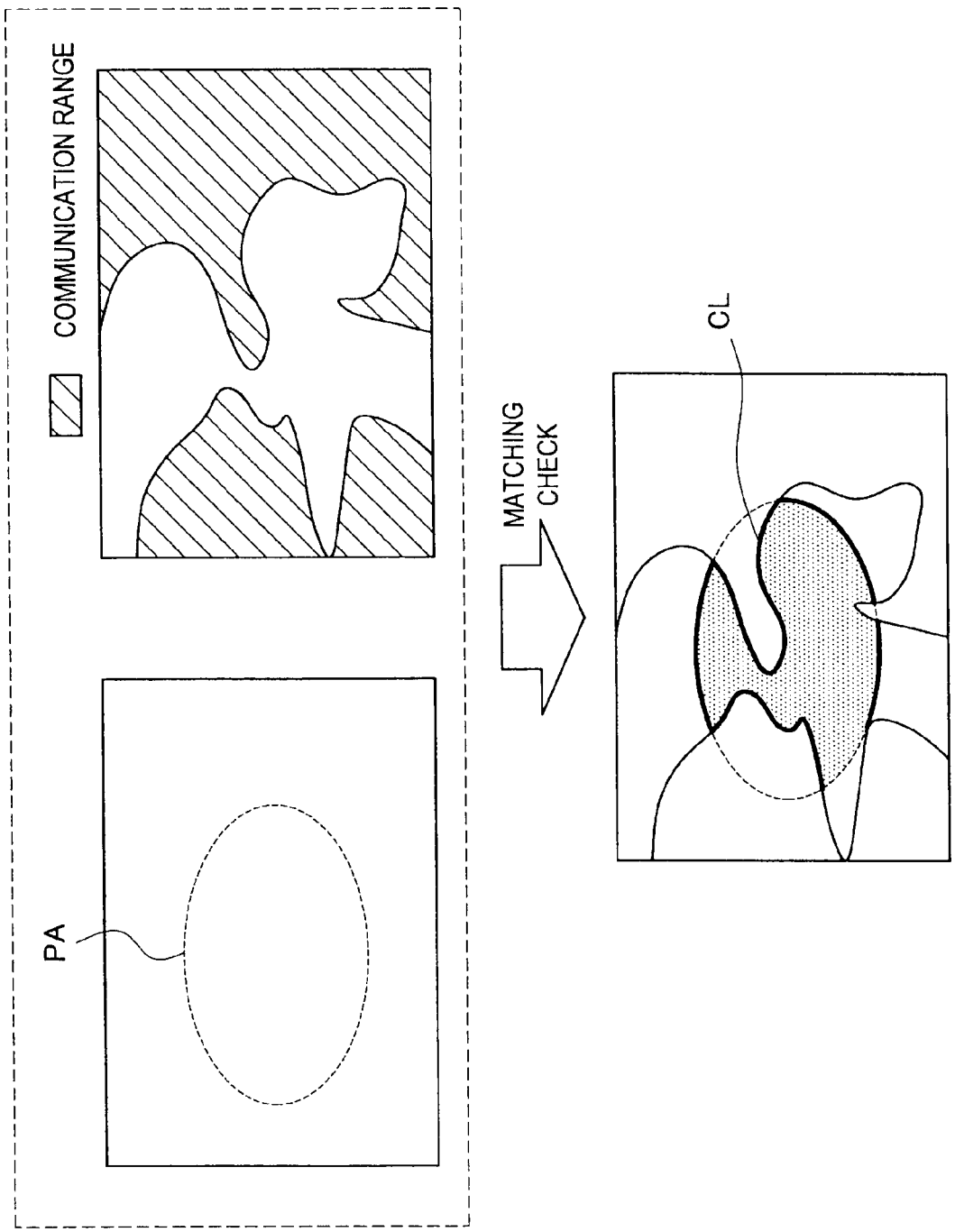
FIG. 14 is an explanatory diagram showing an outline of the current location narrow-down processing according to the embodiment.

Here, FIG. 13 shows the detail of the narrow-down processing of the area indicating the current location shown in Step S250. Here, the narrow-down processing using the communication range information 13 will be described with reference to FIG. 14. FIG. 14 is an explanatory diagram showing an outline of the current location narrow-down processing according to the embodiment.

First, the identification section 107 checks the extraction area PA (here, extraction area PA-1 that has been selected) against communication range information (S255). Then, the identification section 107 excludes a matching area, that is, the area that represents the communication range within the extraction area PA, from the area indicating the current location (S260). After that, the identification section 107 identifies the area obtained by excluding the area that represents the communication range within the extraction area PA as the current location CL (S265).

4. Third Embodiment

Example Having Altitude Calculation Function (4-1. Functional Configuration)

Figure 15:
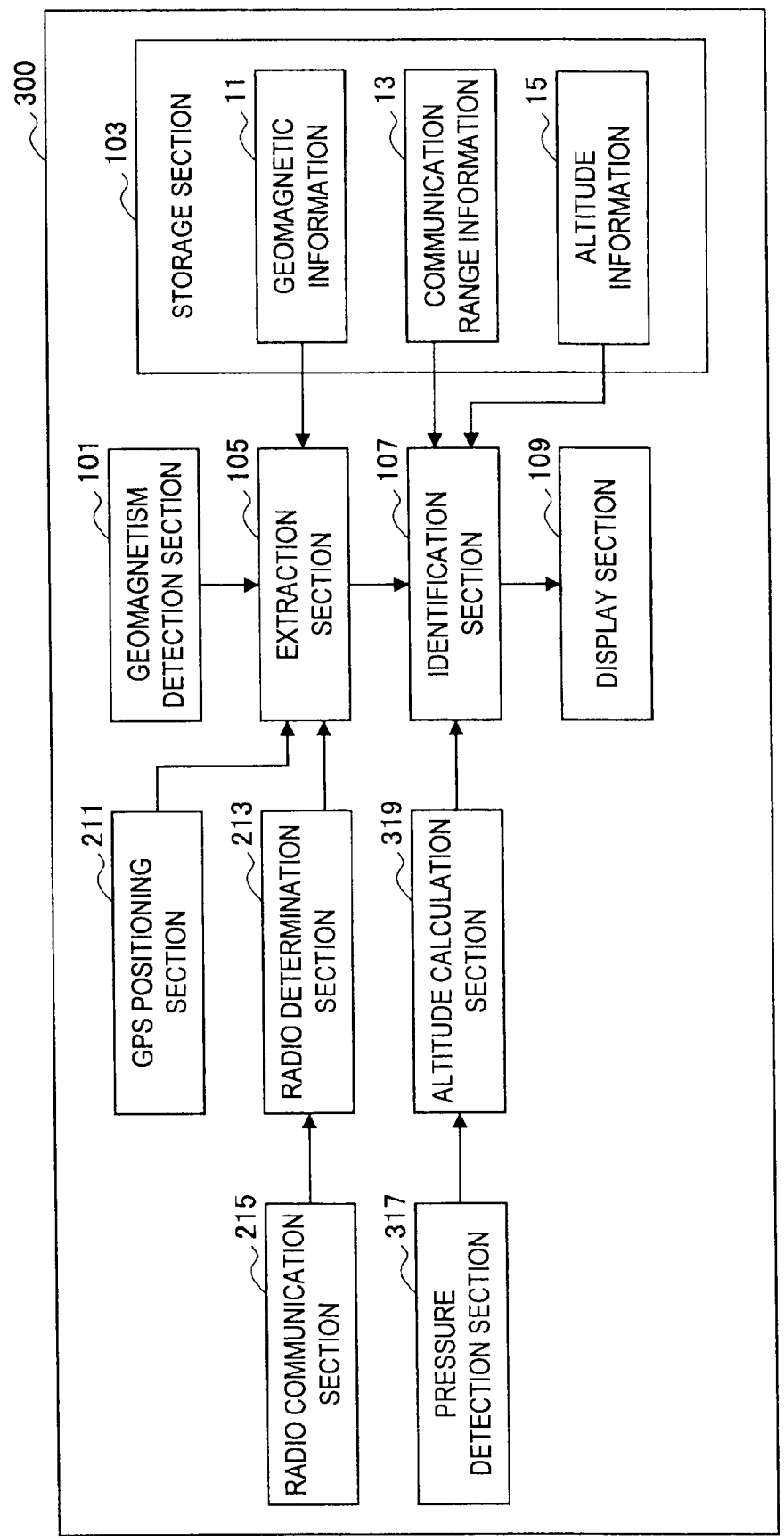
FIG. 15 is a functional block diagram of a positioning device according to a third embodiment of the present disclosure.

Next, with reference to FIG. 15, a functional configuration of a positioning device 300 according to a third embodiment of the present disclosure will be described. The positioning device 300 differs from the positioning device 200 according to the second embodiment in that the positioning device 300 has a function of calculating an altitude of a current location and a function of narrowing down an area indicating the current location using information of the altitude.

The positioning device 300 mainly includes a geomagnetism detection section 101, a storage section 103, an extraction section 105, an identification section 107, a display section 109, a GPS positioning section 211, a radio determination section 213, a radio communication section 215, a pressure detection section 317, and an altitude calculation section 319. Hereinafter, the structural elements that are different from those included in the positioning device 200 according to the second embodiment will be mainly described.

The pressure detection section 317 has a function of detecting surrounding pressure. The pressure detection section 317 supplies the altitude calculation section 319 with pressure data indicating the detected pressure.

The altitude calculation section 319 has a function of calculating the altitude of the current location based on the pressure data supplied by the pressure detection section 317. In the present embodiment, the altitude calculated by the altitude calculation section 319 is used for the narrow-down processing for an area indicating the current location performed by the identification section 107.

The identification section 107 has, in addition to the functions described for the positioning device 200 according to the second embodiment, a function of identifying the current location using the information of altitude calculated by the altitude calculation section 319. The identification section 107 checks altitude information 15 associated with an absolute position against the value of the altitude calculated by the altitude calculation section 319, and can thereby identify, as the current location, the area having the matching altitude value out of the extraction area extracted by the extraction section 105.

Heretofore, an example of the functions of the positioning device 300 according to the present embodiment has been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the positioning device 300 according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

(4-2. Operation)

Figure 16:
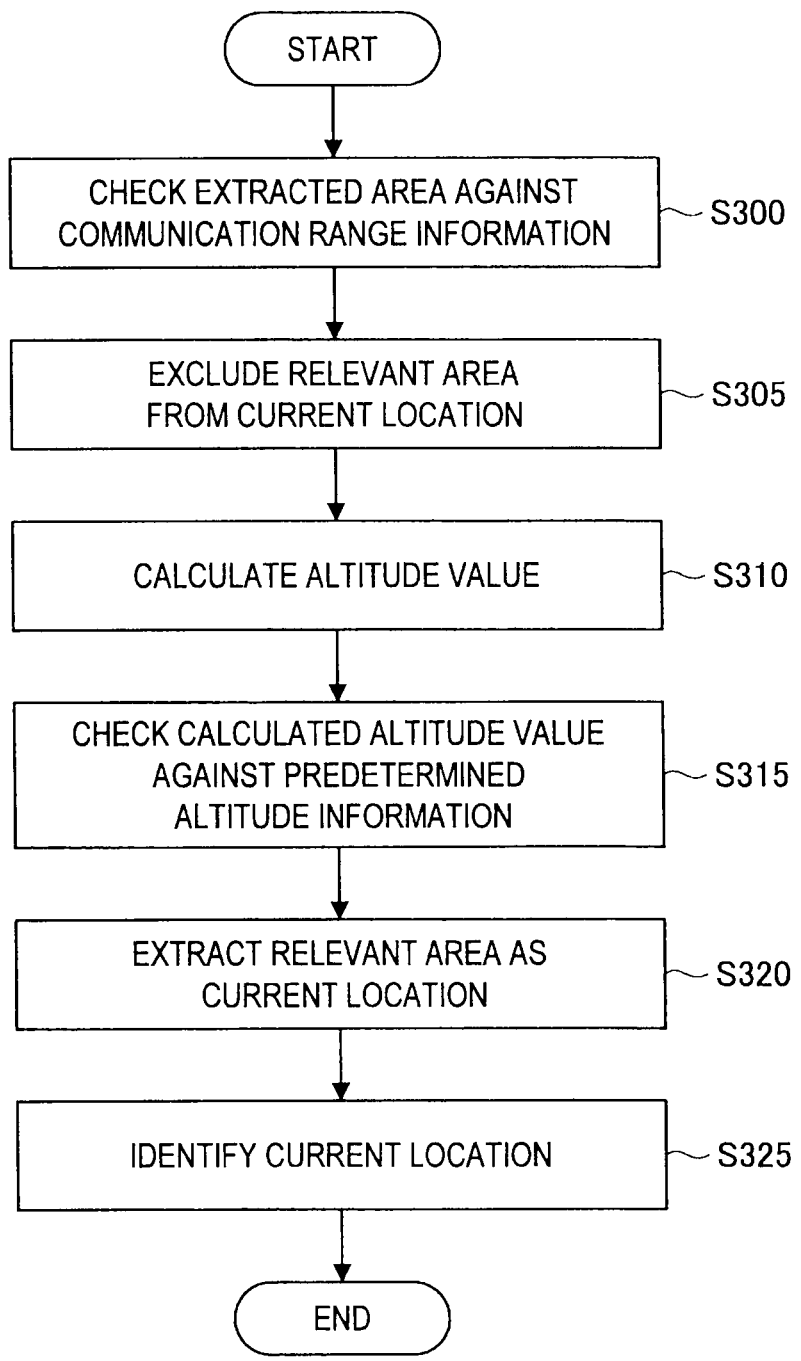
FIG. 16 is a flowchart showing an operation of the positioning device according to the embodiment.
Figure 17:
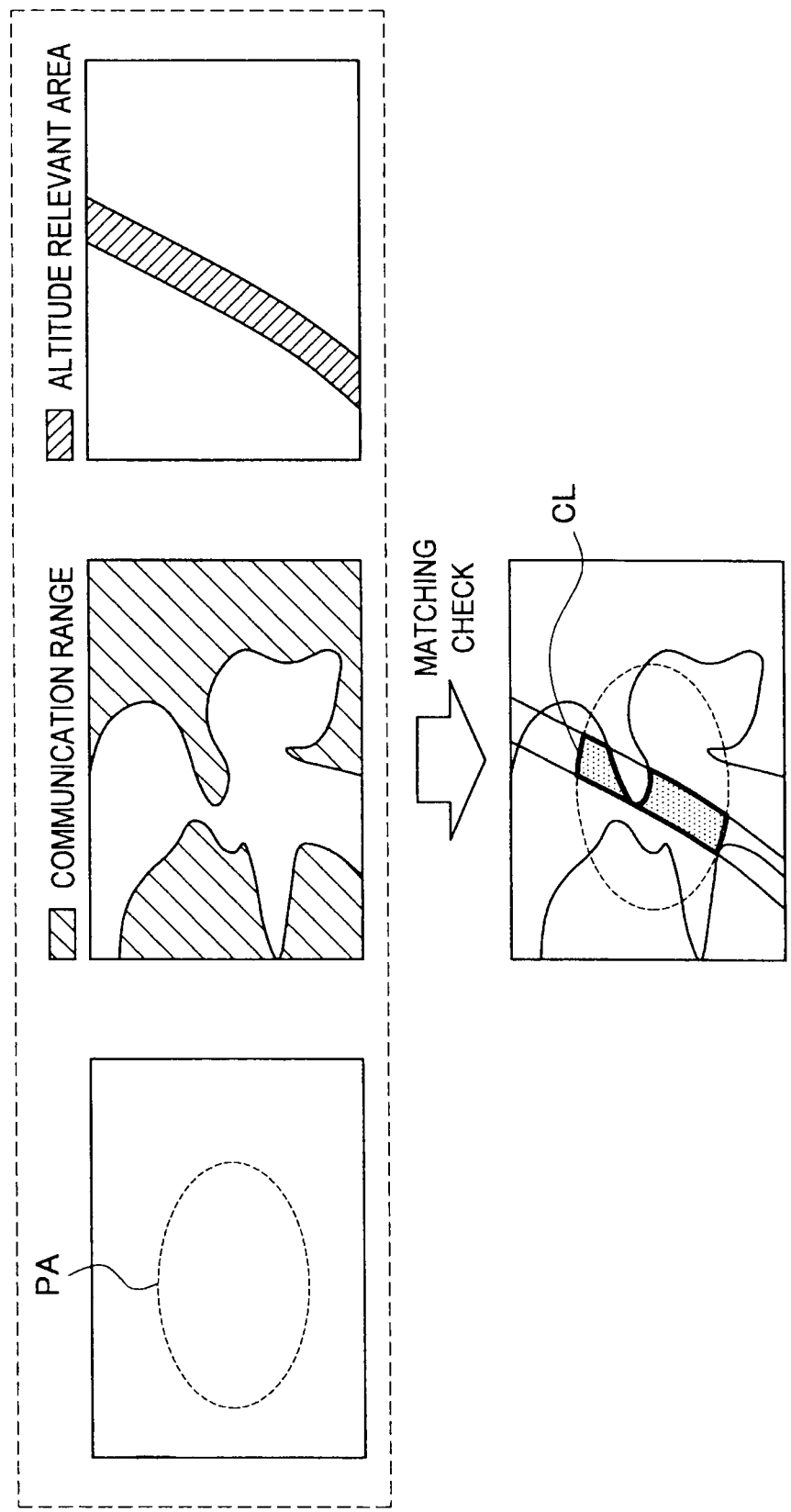
FIG. 17 is an explanatory diagram showing an outline of current location narrow-down processing according to the embodiment.

Here, with reference to FIG. 16 and FIG. 17, an operation of the positioning device 300 according to the third embodiment will be described. FIG. 16 is a flowchart showing an operation of the positioning device according to the embodiment. FIG. 17 is an explanatory diagram showing an outline of current location narrow-down processing according to the embodiment. Note that, as for the operation shown in FIG. 10 and FIG. 11, the operation of the positioning device 300 is the same as that shown in the second embodiment, and therefore, the description thereof will be omitted here. In comparison to the operation of the positioning device 200, the operation of the positioning device 300 differs in that the narrow-down processing shown in Step S250 of FIG. 11 is changed to the operation shown in FIG. 16, and hence, this narrow-down processing will be described below.

First, the identification section 107 checks the extraction area PA against the communication range information 13 (S300). Then, the identification section 107 excludes a matching area, that is, the area that represents the communication range within the extraction area PA, from the area indicating the current location (S305). Here, the altitude calculation section 319 calculates an altitude value using the value of pressure obtained by the pressure detection section 317 (S310). The identification section 107 checks the calculated altitude value against predetermined altitude information 15 with respect to the extraction area PA (S315). Then, the identification section 107 extracts an area having the matching altitude out of the extraction area PA (S320). Then, the identification section 107 identifies the extracted area as the current location CL (S325). That is, as shown in FIG. 17, based on the extraction area PA, the communication range, and the matching altitude area, the identification section 107 can set the area within the extraction area that is outside the communication range and has the matching altitude area, as the current location.

5. Hardware Configuration

The configuration to be used in the positioning device 100, the positioning device 200, and the positioning device 300 according to the first to third embodiments described above can be changed appropriately in accordance with the technical level each time when the embodiment is carried out. Here, there will be described an example of hardware configuration for realizing the positioning device 100, the positioning device 200, and the positioning device 300. Note that the hardware configuration described here is an example, and a part of the structural elements can be omitted or added.

The positioning device 100, the positioning device 200, and the positioning device 300 each include, for example, a GPS antenna 121, a GPS processing section 123, a communication antenna 125, a communication processing section 127, a geomagnetic sensor 129, an acceleration sensor 131, a gyro sensor 133, a pressure sensor 135, an A/D (Analog/Digital) conversion section 137, a CPU (Central Processing Unit) 139, a ROM (Read Only Memory) 141, a RAM (Random Access Memory) 143, an operation section 147, a display section 149, a decoder 151, a speaker 153, an encoder 155, a microphone 157, and a storage section 159.

The GPS antenna 121 is an example of an antenna which receives a signal from a positioning satellite. The GPS antenna 121 is capable of receiving GPS signals from multiple GPS satellites, and inputs the received GPS signals to the GPS processing section 123. Note that the GPS signals received here include orbital data indicating orbits of the GPS satellites and information such as transmission time of the signals.

The GPS processing section 123 is an example of a calculation section which calculates position information based on the signals received from the positioning satellites. The GPS processing section 123 calculates current position information based on the multiple GPS signals input from the GPS antenna 121, and outputs the calculated position information. To be specific, the GPS processing section 123 calculates positions of the respective GPS satellites based on the orbital data obtained by demodulating the multiple GPS signals, and calculates distances from the respective GPS satellites to the positioning device based on the differences between transmission time and reception time of the GPS signals. Then, based on the calculated positions of the respective GPS satellites and the calculated distances from the respective GPS satellites to the positioning device, a current three-dimensional position is calculated.

The communication antenna 125 is an antenna having a function of receiving a communication signal via a mobile communication network or a wireless LAN (Local Area Network) communication network, for example. The communication antenna 125 can supply the communication processing section 127 with a received signal.

The communication processing section 127 has a function of performing various types of signal processing to the signal supplied by the communication antenna 125. The communication processing section 127 can supply the CPU 139 with a digital signal generated from the supplied analog signal.

The geomagnetic sensor 129 is a sensor for detecting geomagnetism as a voltage value. The geomagnetic sensor 129 may be a 3-axis geomagnetic sensor which detects geomagnetism in the X-axis direction, the Y-axis direction, and the Z-axis direction. Here, for example, the X-axis represents the longitudinal direction of a display screen of the positioning device, the Y-axis represents the lateral direction of the display screen, and the Z-axis represents the direction that is perpendicular to the X-axis and the Y-axis. The geomagnetic sensor 129 inputs the detected geomagnetic data to the A/D conversion section 137.

The acceleration sensor 131 is a sensor for detecting acceleration as a voltage value. The acceleration sensor 131 may be a 3-axis acceleration sensor which detects acceleration along the X-axis direction, acceleration along the Y-axis direction, and acceleration along the Z-axis direction. The acceleration sensor 131 inputs the detected acceleration data to the A/D conversion section 137.

The gyro sensor 133 is a measuring instrument for detecting an angle or an angular velocity of an object. The gyro sensor 133 is desirably a 3-axis gyro sensor which detects a variable velocity (angular velocity) of the rotation angle around each of the X-axis, the Y-axis, and the Z-axis as a voltage value. The gyro sensor 133 inputs the detected angular velocity data to the A/D conversion section 137.

The pressure sensor 135 is a sensor for detecting the surrounding pressure as a voltage value. The pressure sensor 135 detects a pressure at a predetermined sampling frequency, and inputs the detected pressure data to the A/D conversion section 137.

The A/D conversion section 137 has a function of converting the input analog signal into a digital signal and outputting the digital signal. The A/D conversion section 137 is a converter circuit for converting an analog signal into a digital signal, for example. Note that the A/D conversion section 137 may be built into each sensor.

The CPU 139 functions as an arithmetic processing unit and a control unit and controls the overall operation inside the positioning device according to various programs. Further, the CPU 139 may be a microprocessor. The CPU 139 can realize various functions according to the various programs. For example, the CPU 139 can function as an azimuth calculation section which detects an attitude angle based on the acceleration data detected by the acceleration sensor 131, and then calculates an azimuth using the attitude angle and the geomagnetic data detected by the geomagnetic sensor 129. Further, the CPU 139 can function as a speed calculation section which calculates a speed at which the positioning device moves based on the acceleration data detected by the acceleration sensor 131 and the angular velocity data detected by the gyro sensor 133. Further, the CPU 139 can also function as an altitude calculation section which calculates an altitude of the current location based on the pressure data detected by the pressure sensor 135.

The ROM 141 can store programs and arithmetic parameters used by the CPU 139. The RAM 143 temporarily stores programs used during execution of the CPU 139 and parameters that appropriately change during the execution thereof.

The operation section 147 has a function of generating an input signal used by a user for performing a desired operation. For example, the operation section 147 may be configured from, for example, an input section for inputting information by the user, such as a touch panel, a mouse, a keyboard, a button, a microphone, a switch, and a lever, and an input control circuit which generates an input signal based on the input by the user and outputs the generated input signal to the CPU 139.

The display section 149 is an example of an output device, and may be a liquid crystal display (LCD) device, an organic EL (organic light emitting diode (OLED)) display device, or the like. The display section 149 displays a screen to the user, and thereby being able to provide information.

The decoder 151 has a function of performing decoding, analog conversion, and the like of input data in accordance with the control of the CPU 139. For example, the decoder 151 performs decoding, analog conversion, and the like of the audio data input via the communication antenna 125 and the communication processing section 127, and outputs an audio signal to the speaker 153. The speaker 153 can output the audio based on the audio signal supplied from the decoder 151.

The encoder 155 has a function of performing digital conversion, encoding, and the like of input data in accordance with the control of the CPU 139. The encoder 155 can perform digital conversion, encoding, and the like of the audio data input from the microphone 157, and can output the audio data. The microphone 157 can collect and output the audio as an audio signal.

The storage section 159 is a device for storing data, and can include a storage medium, a recording device for recording data in the storage medium, a reading device for reading out the data from the storage medium, and a deletion device for deleting the data recorded in the storage medium. Here, as the storage medium, there may be used a non-volatile memory such as a flash memory, an MRAM (Magnetoresistive Random Access Memory), a FeRAM (Ferroelectric Random Access Memory), a PRAM (Phase change Random Access Memory), and an EEPROM (Electronically Erasable and Programmable Read Only Memory), and a magnetic recording medium such as an HDD (Hard Disk Drive). The storage section 159 can store a geomagnetic information DB 161, a map DB 163, and a communication range DB 165, for example. The geomagnetic information DB 161 includes information of the total magnetic intensity and the magnetic dip associated with an absolute position. The map DB 163 can include various types of information associated with position information, such as information of POI (Point Of Interest), altitude information, and road information. Note that, although the map DB 163 is included in the positioning device here, the present technology is not limited to such an example. The map DB 163 may be included in an external device. The positioning device may have a configuration such that the positioning device accesses the map DB 163 included in the external device as appropriate and thereby acquiring various types of information associated with the position information. Further, the map DB 163 may have a configuration such that the map DB 163 acquires surrounding map information of the current location as appropriate from the external device. The communication range DB 165 has information of a communication range of the network used by the communication antenna 125. The communication range DB 165 may also have a configuration such that the communication range DB 165 acquires only surrounding information of the current location as appropriate from the external device.

6. Examples of Effects

According to the positioning device 100, the positioning device 200, and the positioning device 300 of the first to third embodiments described above, the current absolute position can be measured based on the total magnetic intensity and the magnetic dip acquired by the geomagnetic sensor. Here, since the positioning devices 100, 200, and 300 each have the geomagnetic information associated in advance with an absolute position, they can acquire the current position information from the information that can be acquired from within the positioning devices, without communicating with another device, which is different from the measurement of a position such as GPS measurement and Wi-Fi positioning. Therefore, there is an effect that the absolute position can be acquired even in a position where it is difficult to receive GPS signals from GPS satellites, for example, such as a position with the sky blocked with trees.

Further, according to the positioning device 200 and the positioning device 300 of the second and third embodiments, in the case of having another function of measuring a position based on different information than geomagnetism and having a positioning function which is more accurate than the geomagnetic positioning, when it is difficult to measure a position using the other positioning function, the geomagnetic positioning can be executed. According to such a configuration, the accuracy of the position information that can be acquired at a current time point can be enhanced. Further, in such a configuration, in the case of having a function of measuring a position based on position information of a base station of a wireless communication network, the positioning device 200 and the positioning device 300 can narrow down the current location using communication range information of the wireless communication network. In this way, the accuracy of the current location identified with a certain range can be enhanced.

In addition, according to the positioning device 300 of the third embodiment, the current location can be narrowed down using information of altitude. In this way, the accuracy of the current location can be further enhanced.

It should be understood by those skilled in the art that various modifications, combinations, sub-combinations and alterations may occur depending on design requirements and other factors insofar as they are within the scope of the appended claims or the equivalents thereof.

For example, in the second embodiment described above, the identification section 107 identifies the current location based on the latest position information obtained by another positioning section, but the present technology is not limited to such an example. For example, the identification section 107 may identify the current location using communication range information. In this case, the identification section 107 checks the communication range information against the extraction area PA, and in the case where the whole part of an extraction area PA is included within the communication range, another extraction area PA including an area that is outside the communication range can be set as the current location.

Further, in the third embodiment described above, the identification section 107 uses the altitude information for narrowing down the area indicating the current location, but the present technology is not limited to such an example. For example, the identification section 107 may use the altitude information for selecting any one area from multiple extraction areas. In this case, the identification section 107 refers to the altitude information of the multiple extraction areas, and in the case where any one of the extraction areas matches with a current altitude, can select the matching extraction area.

Note that in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

Additionally, the present technology may also be configured as below.

(1) A positioning device including:

a geomagnetism detection section which detects geomagnetism;

an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position; and an identification section which identifies a current location based on the area acquired by the acquisition section.

(2) The positioning device according to (1), further including:
a positioning section which measures a current location based on information different from the geomagnetism,
wherein the acquisition section acquires the area when the positioning section is incapable of measuring a position.

(3) The positioning device according to (2),
wherein, when a plurality of areas are acquired by the acquisition section, the identification section identifies the current location based on a position that is measured last by the positioning section.

(4) The positioning device according to (2) or (3), further including:
a radio communication section which establishes a connection with a wireless communication network; and
a storage section which stores information of a communication range of the wireless communication network,
wherein the positioning section measures a current location based on position information of a base station of the wireless communication network, and
wherein the identification section narrows down the current location by excluding the communication range from the area acquired by the acquisition section.

(5) The positioning device according to any one of (1) to (4), further including:
a pressure detection section which detects pressure; and
an altitude calculation section which calculates an altitude based on the pressure detected by the pressure detection section,
wherein the identification section narrows down the current location using information obtained by checking the altitude calculated by the altitude calculation section against altitude information associated with the absolute position.

(6) The positioning device according to any one of (3) to (5),
wherein the identification section sets, as the current location, an area which is near to a position measured last by the positioning section from among the plurality of areas.

(7) The positioning device according to any one of (1) to (6),
wherein the geomagnetism detection section has a geomagnetic sensor and an acceleration sensor, identifies an azimuth based on gravitational acceleration detected by the acceleration sensor, and calculates the magnetic dip.

(8) A positioning method including:
detecting geomagnetism;
acquiring a matching area by checking detected values of a total magnetic intensity and a magnetic dip of the detected geomagnetism against geomagnetic information including values of a total magnetic intensity and a magnetic dip which are associated with an absolute position; and
identifies a current location based on the acquired area.

(9) A program for causing a computer to function as a positioning device including
a geomagnetism detection section which detects geomagnetism,
an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position, and
an identification section which identifies a current location based on the area acquired by the acquisition section.

(10) A computer-readable recording medium which records therein a program for causing a computer to function as a positioning device including a geomagnetism detection section which detects geomagnetism,
an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position, and
an identification section which identifies a current location based on the area acquired by the acquisition section.

The present disclosure contains subject matter related to that disclosed in Japanese Priority Patent Application JP 2011-067002 filed in the Japan Patent Office on Mar. 25, 2011, the entire content of which is hereby incorporated by reference.

What is claimed is:

1. A positioning device comprising:
a geomagnetism detection section which detects geomagnetism;
an acquisition section which acquires a matching area obtained by checking values of a total magnetic intensity and a magnetic dip of the geomagnetism detected by the geomagnetism detection section against geomagnetic information including values of a total magnetic intensity and a magnetic dip which are associated with an absolute position; and
an identification section which identifies a current location based on the area acquired by the acquisition section.

2. The positioning device according to claim 1,
wherein the acquisition section acquires the area when a positioning section is incapable of measuring a position using a global positioning system (GPS) signal.

3. The positioning device according to claim 2,
wherein, when a plurality of areas are acquired by the acquisition section, the identification section identifies the current location based on a position that is measured last by the positioning section.

4. The positioning device according to claim 2, further comprising:
a radio communication section which establishes a connection with a wireless communication network; and
a storage section which stores information of a communication range of the wireless communication network,
wherein the positioning section measures a current location based on position information of a base station of the wireless communication network, and
wherein the identification section narrows down the current location by excluding the communication range from the area acquired by the acquisition section.

5. The positioning device according to claim 1, further comprising:
a pressure detection section which detects pressure; and
an altitude calculation section which calculates an altitude based on the pressure detected by the pressure detection section,
wherein the identification section narrows down the current location using information obtained by checking the altitude calculated by the altitude calculation section against altitude information associated with the absolute position.

6. The positioning device according to claim 3,
wherein the identification section sets, as the current location, an area which is near to a position measured last by the positioning section from among the plurality of areas.

7. The positioning device according to claim 1,
wherein the geomagnetism detection section has a geomagnetic sensor and an acceleration sensor, identifies an azimuth based on gravitational acceleration detected by the acceleration sensor, and calculates the magnetic dip.

8. A positioning method comprising:

detecting geomagnetism;

acquiring a matching area by checking detected values of a total magnetic intensity and a magnetic dip of the detected geomagnetism against geomagnetic information including values of a total magnetic intensity and a magnetic dip which are associated with an absolute position; and identifies a current location based on the acquired area.

9. A non-transitory computer-readable recording medium having stored thereon, a set of computer-executable instructions executable by one or more processors for causing a computer to perform steps comprising:

detecting geomagnetism, acquiring a matching area by checking values of a total magnetic intensity and a magnetic dip of the detected geomagnetism against geomagnetic information including values of a total magnetic intensity and a magnetic dip which are associated with an absolute position, and identifying a current location based on the acquired area.

* * * * *